United States Patent [19]

Soderholm et al.

[11] 3,997,014
[45] Dec. 14, 1976

[54] MOUNTING AND PROTECTIVE MEANS IN FORCE MEASURING OF WEIGHING DEVICES

[75] Inventors: Arne Söderholm; Alf Fluur, both of Bromma, Sweden

[73] Assignee: S.E.G. Instrument AB, Vallingby, Sweden

[22] Filed: Oct. 6, 1975

[21] Appl. No.: 620,065

[30] Foreign Application Priority Data

Oct. 23, 1974  Sweden .......................... 74133133

[52] U.S. Cl. .................................. 177/128; 177/155
[51] Int. Cl.[2] ....................................... G01G 23/02
[58] Field of Search ..................... 177/128, 154–156

[56] References Cited

UNITED STATES PATENTS

| | | | |
|---|---|---|---|
| 2,962,275 | 11/1960 | Thurston | 177/211 |
| 3,199,619 | 8/1965 | Hathaway | 177/154 X |

FOREIGN PATENTS OR APPLICATIONS

| | | | |
|---|---|---|---|
| 1,214,428 | 4/1966 | Germany | 177/155 |

Primary Examiner—George H. Miller, Jr.

[57] ABSTRACT

A mounting and protective means for use in force measuring or weighing devices comprising a load carrier and a load transmitting means. Its purpose is to facilitate the mounting of the carrier and the transmitting means and to constitute a limiter for lateral displacements in the plane perpendicular to the load action line of the carrier. The mounting and protective means comprises two parts which at measuring are in contact with the transmitting means, one of the parts being also connected to the load carrier and the other part to a foundation for the carrier. The two parts can be brought into at least two positions mutually in the load transmission direction. In one mutual position they are fixed in such position in said plane which the transmitting means is desired to have as initial measuring position. In another, possibly the same, position, this is chosen to enable the transmitting means to be inserted or taken out. Further, the parts may be brought in such mutual position in said direction, that they are freely movable in said plane, as is necessary at load measurement, but the movability is limited by stop devices to suitable predetermined values.

6 Claims, 12 Drawing Figures

FIG.1
FIG.2
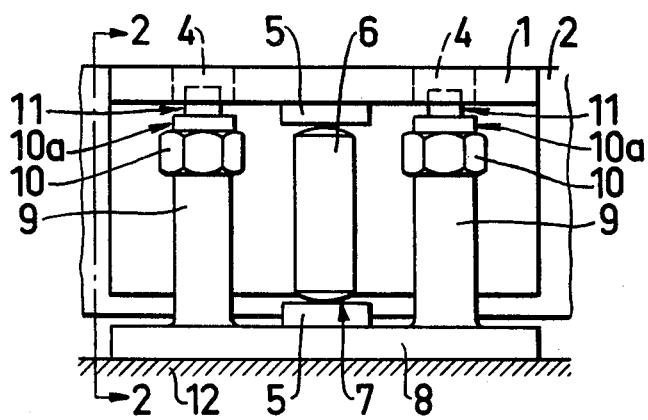
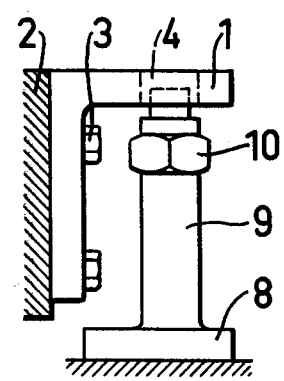
FIG.3 FIG.4 FIG.5 FIG.6
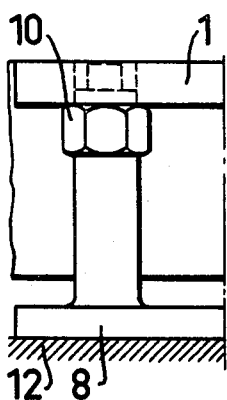
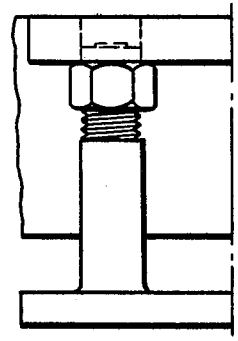
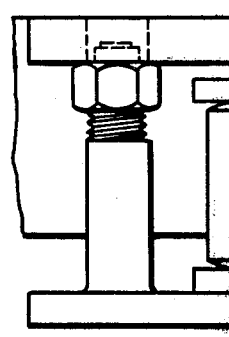
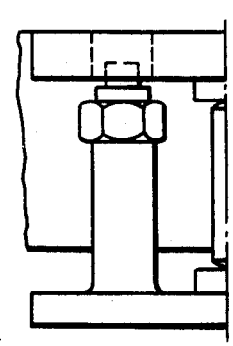
FIG.7
FIG.8
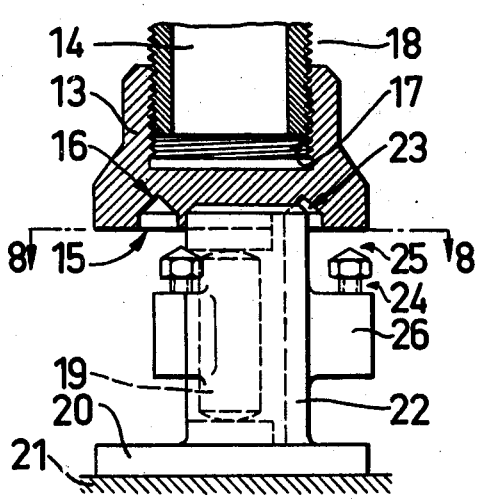
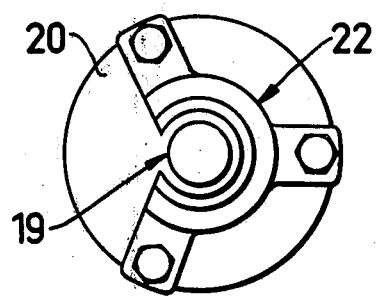

MOUNTING AND PROTECTIVE MEANS IN FORCE MEASURING OF WEIGHING DEVICES

The present invention refers to a mounting and protective means in accordance with the preamble of claim 1, for use in force measuring or weighing devices. The device comprises parts which are positioned between the load carrier and its foundation in the points where the load via load transmitting means is transmitted to the foundation and is simultaneously measured. On one hand its purpose is to facilitate the mounting of the load carrier and its load transmitting means and on the other hand to be a limiter for lateral displacements perpendicularly to the load action line of the load carrier. Such lateral displacements occur for instance on account of disturbing horizontal forces on a weighing bridge.

For example in order to weigh an object, this is placed on a load carrier (scale of balance), the total load of which being transmitted to the environment (the foundation) via load transmitting means. Said means may consist of load measuring sensors which transform the sensed load into a signal, the magnitude of which is a measure of the weight. When the load carrier is exposed to the weight of the object, it will be deformed, and these deformations bring about lateral displacements and angle changes at the insertion points of the load transmitting means. If the deformations are prevented, corresponding lateral forces and moments in these points arise instead.

In order to avoid the same, the load transmitting means are often made yielding in said directions. Several devices with said property are known, as in the U.S. Pat. No. 2,962,275, the Swedish patent Nos. 341,277 and 366,116.

When mounting the load transmitting means, it is difficult correctly to place them in the right position, i.e., so that in their rest position, before load is applied to the object, said means have a main direction which coincides with the action direction of the applied load.

On account of the yielding of the load transmitting means to displacements and angle changes, stoppers are required, which limit the motions to permitted values at exceptional conditions, as for instance in the case the object is a vehicle, the motions caused by its mass forces at deceleration of the load carrier — the weighing bridge. It is known that such movements can be taken up by stop members, which allow a certain movement as in the Swedish Pat. No. 341,277, or by bars placed perpendicularly to the action direction of the measured load as in the U.S. Pat. No. 2,962,275. Such devices are, however, difficult to adjust so that the rest position of the load carrier is correctly maintained.

The Swedish Pat. No. 341,277 has thus a stop member but this is not intended to be a means for facilitating the right mounting of the load transmitting unit to the load carrier. The device consists of a part transmitting load to the load sensor which part is yielding to lateral movements, and which movements are also limited by a stop device. However, said device causes difficult mounting of the load sensor since it encloses the load sensor in order to make it possible for the upper part of the device to assume stable positions.

The present invention is intended to solve the problems arising at mounting and use of load transmitting and also laterally yielding, load sensing devices.

The said problems are solved by the mounting and protective means according to the invention having the characteristics stated in claim 1.

According to the invention two parts are used which at measuring are in contact with the load transmitting means, one of the parts being also connected to the load carrier and the other part to the foundation for the load carrier. Characterizing is that the two parts can be brought to take at least two positions relative to each other in the load transmission direction. In one of said positions their mutual position is fixed in that position in the plane perpendicular to the action direction of the load, which the load transmitting means is desired to have as an initial position when measuring. In another position, which possibly coincides with the above described position, this is so selected, that the load transmitting means can be brought into the device or be taken out. The said parts can, moreover, be brought in such a position to each other in the above mentioned direction, that they are freely movable in the plane perpendicular to said direction, as is necessary at load measuring, but the movability is limited by stop devices to suitable predetermined values.

Said technical effects may be obtained through different embodiments, which are adapted both to the magnitude of the measuring load and thus to the embodiment of the load sensing device and also to the embodiment of the load carrier.

Some examples of the embodiments are shown in FIGS. 1–12.

FIGS. 1 to 6 show an embodiment which is adapted to such cases which require a low height dimension.

FIGS. 7 to 10 show embodiments adapted to load carriers in the form of containers standing on legs, which constitute load transmitting parts.

Figure 9:
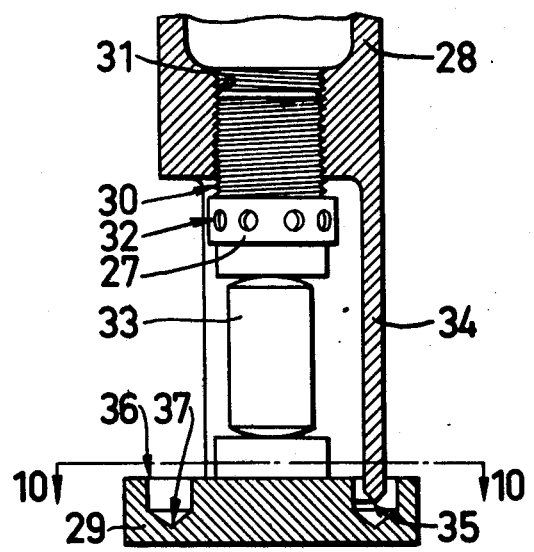

FIG. 1 shows a device with the load transmitting device mounted for measuring. The upper part 1 consists of a bracket, which is secured to the load carrier 2 with screws 3. In the upper side of the bracket 1 two holes 4 are made. The upper part 1 rests on the load transmitting device 5, 6, 7 which consists of two spacer plates 5 between which the load measuring sensor 6, which senses the load and transforms it to, for instance, an electrical signal, is placed. Its upper and under sides have spherical surfaces 7, which roll on the contact surfaces of the spacer plates 5 and thereby permit yielding to displacements of the bracket 1 relative to the lower part 8. By adapting the radii of the spherical surfaces relative to the height of the load measuring sensor, i.e., the distance between the spacer plates 5, the device may be made self-erecting, i.e., tending to take a position which follows the line of action of the measured load. Thus, it is statically stable. How this is obtained is shown in a special embodiment of such a device which is described in the Swedish Pat. No. 366,116.

The lower part 8 is provided with two pillars 9 in the respective upper part of which there is a thread with a nut 10. Above said threaded part there is a pin 11 whose diameter is so adapted that it gives a play relative to the hole 4 in the upper part 1. In the state in which the device according to FIG. 1 is, horizontal displacements of the bracket 1 will be able to take place relative to the lower part 8, to the extent the play between pin and holes so admits. When the bracket 1 is so displaced that the holes contact the pins, its further movement will be stopped and the lateral load which then arises is transmitted to the base 12.

At the mounting of the load carrier 2 and the load transmitting parts first of all the bracket 1 is secured to the load carrier 2. Thereafter the lower part 8 is so placed that the collars 10a of the nuts 10 fit in the holes 4, these parts thus being fixed as is shown in FIG. 3. In the cases the devices according to the invention are placed under several points of support, all are mounted, and the load carrier is then standing stably and may be adjusted to the correct position, the lower part 8 accompanying it. In this position of the load carrier the lower part 8 may be fixed to the base 12.

The next moment of the mounting is apparent from FIG. 4 where the position of the load carrier in vertical direction has been elevated by means of the nuts 10 so much that the load sensor with spacer plates 5, 6, 7 can be inserted from the side. It should be observed that the parts 1 and 8 also in said position are fixed to each other. Suitably the underside of part 1 and the upper side of part 8 should be provided with recesses, which guide the spacer plates 5 of the load sensor to a desired position, i.e., straight above each other. Said recesses are not shown in the Figure.

When the load sensor 6 has been put in position according to FIG. 5, the inner part 1 can be lowered by the nuts 10 being screwed down to the stop. The load sensor then takes over the load, and the play for lateral displacement arises as is apparent from FIG. 6. If the load sensor is desired to be demounted, this can take place by the nuts being again so elevated that their pins 11 are guided into the holes 4 and are also elevated so that they take over the load and a sufficient space between the upper spacer plate 5 and the bracket is obtained.

In FIGS. 7 and 8 the part 13 secured to the load carrier is integrated with the load transmitting part of the load carrier, the leg 14, i.e., is a part thereof. In part 13 there is a circular groove 15 which has a pointed bottom 16, and in its upper side part 13 has a threaded hole 17, which makes adjustment of the mutual position between part 13 and leg 14 possible by the leg being provided with an outer thread 18. Symmetrically under part 13, a laterally movable load measuring sensor 19 is placed which via the plate 20 transmits the measured load to the base member 21.

Rigidly secured to the plate 20 is a cylinder 22, whose section is circularly tubular with about one third of the circumference removed as is apparent from FIG. 8. The removed part constitutes the opening being necessary for mounting the load measuring sensor 19. The upper part of the cylinder is provided with a pointed cross section 23, with the diameter of the point about equal to the one of the pointed bottom 16.

In order to bring the parts 13 and 22 in different position to each other in the direction of the measured load, there are three adjusting bolts 24, the heads 25 of which are pointed and whose screw parts are screwed into the protrusions 26 which are rigidly secured in the cylinder 22.

When mounting the load carrier and the load carrying part, the part 13 is put on the part 22, and when the bolts 24 are in their lowest positions, the groove 16 fixes the pointed upper side 23 of the cylinder in unambigous position in the horizontal plane. When the device has been placed in a desired position on the foundation 21, the load transmitting part 14 of the load carrier and the part 13 are raised so screwed up by the bolts 24 that their points 25 are pressed against part 13. The points are thereby pressed into the material, and the position in horizontal direction between the parts 13 and 22 is maintained, also when the same have been removed from each other so much that the load measuring sensor can be inserted. The underside of the part 13 and the upper side of the plate 22 have suitably concentrically placed grooves so adapted that they guide the load measuring sensor 19 into position in lateral direction. Said grooves are not shown in the Figure. If the bolts 24 are again screwed down in the protrusion 26, the load measuring sensor 19 takes over the load transmission and through a suitable adaptation of the heights of the cylinder 22 and the load measuring sensor 19, the groove 15 and the upper part of the cylinder 22 will in a lateral direction have a play which in the horizontal plane allows movements corresponding to the size of the play.

Figure 10:
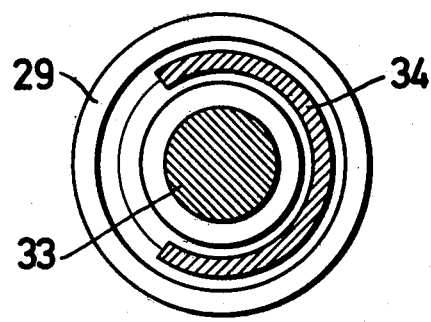

FIGS. 9 and 10 show also an embodiment where the part 27 secured to the load carrier, is integrated with the load transmitting part 28. In order To bring the upper part 27 and the lower part, the plate 29, into different positions to each other in the direction of the measured load, part 27 is provided with the thread 30 which is screwed into the part 28, which has the corresponding inner thread 31. Said operation is executed by means of a so-called pin wrench placed in the holes 32. In the Figure the parts are in a load measuring position, the load being transmitted from the part 27 via the load measuring sensor 33 to the plate 29. The lower part of part 28 is a cylinder with a circular tube form 34 and with about one third of the circumference removed, as is shown in FIG. 10. The lower edge of the cylinder 34 has a pointed cross section 35 which fits in the pointed bottom 37 of the groove 36 when they are given the same diameter. The positions of the parts 27, 28 and 34 and part 29 respectively necessary for mounting and measuring, are adjusted by rotating the part 27 by means of the pin wrench, the part 27 in a screwed up position thus giving the mounting position, as is described in connection with FIGS. 7 and 8. Also the other positions are obtained in a manner analogous with the embodiment according to FIGS. 7 and 8. The embodiment according to FIGS. 9 and 10 admits a certain limited possibility to adjust vertically the load transmitting unit thus designed. This is an advantage with regard to the distribution of the load in cases when the load carrier is placed on an uneven foundation.

Figure 11:
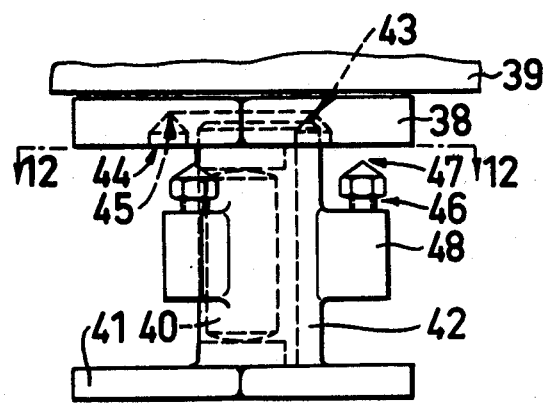
FIGS. 11 and 12 show an embodiment which is intended to be placed under load carriers with a substantially plane underside, such as lying tanks or platforms.
Figure 12:
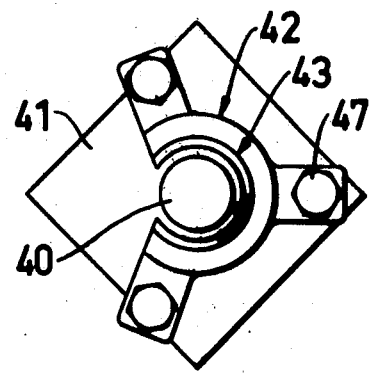

FIGS. 11 and 12 show an embodiment, where the upper part consists of the plate 38, which rests against the load carrier 39 and possibly is secured therein by means of welding. The load measuring sensor 40 transmits the load to the plate 41 of the lower part. Rigidly secured to the plate is a cylinder 42, whose section is circularly tubular with about one third of the circumference removed, as is apparent from FIG. 11.

The upper end of the cylinder is provided with a pointed cross section 43 which fits in the pointed bottom 45 of the circular groove 44, when they are given the same diameter. In order to bring the parts 38 and 41, 42 in a different position to each other in the direction of the measured load, there are three adjustment bolts 46, the heads 47 of which are pointed and whose screw parts are screwed into the protrusions 48 which are rigidly secured in the cylinder 42. The mounting of the load carrier takes place in the same manner as is described in connection with FIGS. 7 and 8.

The embodiments described according to FIGS. 1–12, admit over and above lateral displacements — transversal movements — in the plane perpendicular to the direction of the measuring force, also angle changes around the two axes perpendicular to the direction of the measuring force. Said angle changes are also limited as to their magnitude in the same manner as transversal movements.

In the embodiments shown above the load transmitting part in all the examples has been assumed to consist of a load measuring pick-up with spherical ends for achieving a lateral movability. As is mentioned in the introductory portion, the load transmitting part may be of other constructions, as long as they have lateral movability. Besides its use as a mounting and protective means the subject matter according to the invention can also serve as a locking device for a load carrier which may be of need at repairs or expected, exceptional overweights.

What is claimed is:

1. Mounting and protective means intended to be part of a force measuring or weighing device which consists of load carriers (2, 39) carried by load transmitting means (6, 40), whose load transmission is a measure of the load, and which load transmitting means are movable from their respective desired initial positions to allow displacements of the load carrier relative to its foundation (12) in at least the plane normal to the transmission and action direction of the load, the said mounting and protective means consisting of two parts in a row on either side of the load transmitting and displacement-absorbing means, one of the said parts (1, 38) being positioned between the load carrier and the load transmitting means, for transmitting load from the load carrier to the said means, and the other part (8, 42) being positioned between the load transmitting means and the foundation, transmitting load from the said means to the foundation, characterized in that the two parts (1, 38) and 8, 42 respectively) may be arranged to assume at least two positions relative to each other in the action direction of the load, and that in one such position the two parts have load transmitting contact with each other and are mutually fixed in that position so as to not permit motion in the plane normal to the action direction of the load, which causes the load transmitting means to assume the said initial position.

and in another mutually fixed position, possibly coincident with said one position, the position is so adjusted that the load transmitting means (6, 40) may be brought into or out of the mounting and protective means, and in a further position, when measuring, the parts of the mounting and protective means have no load transmitting contact with each other, and free movements between the parts are admitted to suitable movement distances determined by plays between the parts.

2. Mounting and protective means according to claim 1, characterized in that the two parts are brought to their positions by means of one or more threaded screws (24, 46) positioned in one part (22, 42) with their symmetry axes substantially in the action direction of the force, the action end of said screws being provided with means for providing guidance in the plane perpendicular to the action plane of the force.

3. Mounting and protective means according to claim 1 characterized in that the two parts (1) and (8) respectively are brought to their positions by means of one or more nuts (10) with their symmetry axes disposed substantially in the action direction, each said nut being threaded on a pillar (9) positioned at one of the parts, and the action end of each nut forming at least one guide sleeve (11) which is guided in a corresponding hole (4) in the other part.

4. Mounting and protective means according to claim 1, characterized in that the part (34) connected to the load carrier is integrated therewith.

5. Mounting and protective means according to claim 1, characterized in that the part connected to the foundation of the load carrier is integrated therewith.

6. Mounting and protective means according to claim 1, characterized in that the two parts are integrated with the load carrier and the foundation of the load carrier respectively.

* * * * *

UNITED STATES PATENT OFFICE
CERTIFICATE OF CORRECTION

Patent No. 3,997,014  Dated December 14, 1976

Inventor(s) Arne Soderholm and Alf Fluur

It is certified that error appears in the above-identified patent and that said Letters Patent are hereby corrected as shown below:

Column 5, line 39 delete ")",

Column 6, line 6 change "." to --,--.

Signed and Sealed this

Twenty-second Day of March 1977

[SEAL]

Attest:

RUTH C. MASON
Attesting Officer

C. MARSHALL DANN
Commissioner of Patents and Trademarks